United States Patent
Riviere-Cazaux

(10) Patent No.: US 7,735,029 B2
(45) Date of Patent: Jun. 8, 2010

(54) METHOD AND SYSTEM FOR IMPROVING THE MANUFACTURABILITY OF INTEGRATED CIRCUITS

(75) Inventor: Lionel Riviere-Cazaux, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 11/720,127

(22) PCT Filed: Nov. 30, 2004

(86) PCT No.: PCT/EP2004/014918

§ 371 (c)(1),
(2), (4) Date: Dec. 6, 2007

(87) PCT Pub. No.: WO2006/058560

PCT Pub. Date: Jun. 8, 2006

(65) Prior Publication Data

US 2008/0134106 A1 Jun. 5, 2008

(51) Int. Cl.
G06F 17/50 (2006.01)

(52) U.S. Cl. .............................. 716/2; 716/18

(58) Field of Classification Search ............ 716/1, 716/2, 18
See application file for complete search history.

(56) References Cited

U.S. PATENT DOCUMENTS

| | | | |
|---|---|---|---|
| 5,557,533 | A | 9/1996 | Koford et al. |
| 5,798,937 | A | 8/1998 | Bracha et al. |
| 6,026,224 | A | 2/2000 | Darden et al. |
| 7,194,704 | B2 * | 3/2007 | Kotani et al. .......... 716/2 |
| 2002/0133791 | A1 | 9/2002 | Cohn et al. |
| 2003/0014726 | A1 | 1/2003 | Hasegawa |
| 2005/0234684 | A1 * | 10/2005 | Sawicki et al. .......... 703/1 |

OTHER PUBLICATIONS

Guardiani et al; "Proactive design for manufacturing (DFM) for nanometer SoC designs"; IEEE 2004 Custom Integrated Circuits Conference, USA, pp. 309-316.
Pujari et al; "Interconnect Synthesis for Lithography and Manufacturability in Deep Submicron Design"; 12th Workshop on Synthesis and System Integration of Mixed Information Technologies, Sasimi 2004, pp. 181-188.
Harrison et al; "A simple via duplication tool for yield enhancement"; 2001 IEEE International Symposium on Defect and Fault Tolerance in VLSI Systems, USA 2001, pp. 39-47.
International Search Report and Written Opinion correlating to PCT/EP2004/014918, dated May 13,2005.
Office Action - SC135665CF-EPC rejection, dated Apr. 7, 2008.

* cited by examiner

Primary Examiner—Jack Chiang
Assistant Examiner—Binh C Tat

(57) ABSTRACT

At a particular stage in design of an integrated circuit, DFM improvements are identified which might conflict with design requirements applicable during a subsequent stage in the design flow. These DFM improvements are "reserved" that is, they are not implemented right away. However, an instance of a DFM-optimized version of this portion of the design is generated, characterized and stored. Meta information is associated with the reserved DFM improvements, for example locations in the design which correspond to the reserved DFM improvements are tagged. If, after the subsequent stage in the design flow, processing of the meta-information (tags) shows that the reserved DFM improvement does not actually conflict with the potentially-conflicting design requirement, the corresponding reserved DFM improvement is implemented, for example, by swapping-in the stored instance of the DFM-optimized version of this portion of the design.

12 Claims, 6 Drawing Sheets

METHOD AND SYSTEM FOR IMPROVING THE MANUFACTURABILITY OF INTEGRATED CIRCUITS

The present invention relates to the field of design of semiconductor integrated circuits and, more particularly, to the application of so-called "design for manufacturability" principles when designing such circuits.

As integrated circuit manufacturing technology has developed, VLSI techniques have increased the density of features on a wafer, thus making circuit design more complex. Increasingly, the design of semiconductor integrated circuits is handled using computer-aided design (CAD) systems and, notably, employing electronic design automation (EDA) techniques.

FIG. 1 is a flow diagram outlining the main processes that are generally involved in current EDA techniques for the design of a VLSI semiconductor integrated circuit.

As can be seen in FIG. 1, when an integrated circuit is designed using EDA techniques, first of all the parameters of the design are input, usually using a high-level description language (HDL). A logic synthesis step converts the basic design information into a description of the inter-connected logic functions needing to be implemented in the design. If appropriate, the design is treated as an overall system which must be partitioned into modules which will co-operate in order to implement the overall system under design. In general, simulations are performed at this stage so as to check the logical design of the circuit for flaws. If flaws are found, the design-in-progress is modified.

The above steps in the design flow result in a netlist, a listing of logic functions and the input/output relationships between them required to implement the input design. It is then necessary to produce from the netlist a detailed definition of the conductive and non-conductive regions and tracks that will be formed on the wafer. This part of the design flow is referred to as physical design. During the physical design part of the design flow, circuit elements required to perform the functions specified in the netlist are selected and their physical location on a substrate is determined. Often, the design will be broken down, conceptually, into different functional blocks and each block will be formed by selecting and interconnecting suitably-designed cells.

In order to reduce the time necessary for finalizing a design, and to ensure reliability of circuit components, it is common to make use of libraries of standard or proprietary cells, IP libraries consisting of a collection of intensively-reused advanced functions (such as PLL and advanced IOS), etc. During physical design of an integrated circuit, cells suitable for performing a particular desired logical function can, thus, be obtained simply by accessing a cell library.

In recent years it has been realised that it is important, at the design stage, to take into account the particularities of the processes that will be used to manufacture the integrated circuit. More particularly, it is desirable to design the integrated circuit so that the product yield, and the various processes involved in manufacture, are optimized while at the same time ensuring low cost, acceptable product reliability and safety, etc. This can be referred to as applying "design for manufacturability" (DFM) techniques or principles.

DFM includes aspects, for example, such as optical proximity correction (to account for difficulties that arise in photolithography when the feature sizes to be defined are smaller than the wavelengths being used to define them), the re-use of silicon building blocks that have been tried and tested in earlier designs, etc.

As new manufacturing technologies are being adopted and, notably, as lithography wavelengths drop below 90 nm, it has been found that it is increasingly important to apply DFM principles. Typically, DFM principles are taken into account both when deciding on the various aspects of the circuit's design (e.g. architecture, layout, etc.) and when performing different verifications of the design-in-progress.

At various stages in the design flow there are opportunities to apply a DFM improvement. For example, when designing a cell including a transistor, one possible DFM improvement can consist in providing the transistor with twin contacts. However, a given DFM improvement may conflict with other design requirements. For example, providing the transistor with two contacts may make it harder to route connecting tracks to that transistor or to other components in the same cell. Accordingly, in conventional IC design processes many DFM improvements are not performed because it is feared that they will conflict with other design requirements that are taken into account later in the design flow.

Consider the case of a cell which is to be the subject of horizontal M2 routing (M2 being a second metal used in the circuit). In this context it may be decided that it is unsafe to perform the specific DFM improvement of doubling vertical vias because this might interfere with the subsequent routing process. Accordingly, vertical via doubling is not performed. However, after block synthesis and routing it is found that only 5% of the time are the routing options that have been used such that they would have been affected by vertical via doubling. Thus, 95% of the time potential DFM improvements that could have been made would not have had any adverse effect on the overall design. A valuable opportunity for improving the design (and improving the yield of the finished product) has been wasted.

In a similar way, when working on the schematics, it may be possible to identify DFM improvements which could be applied so as to optimize the electrical properties of one or more components of the circuit. However, these improvements are generally not implemented because, in a subsequent layout step, it might be found that the improvements conflict with other design requirements (such as the requirement to minimize the area occupied on the wafer). In practice, after the layout step has been completed it can be shown that on a large percentage of occasions the potential DFM optimization that has been abandoned could have been implemented after all without any negative consequences.

Once again, during routing DFM considerations may indicate that it would be desirable to space certain wires apart from each other by an increased distance. However, conventionally, such an improvement would not be implemented because of the fear that it could generate problems of overly-large metal density gradient at a junction between blocks. In practice, after block abutment has been performed it can be shown that, in many cases, increasing the spacing of the wires would not have had any adverse effect on the gradient density.

Thus, there are many stages during the design of an IC at which DFM improvements are not performed because of fears that the improvements could conflict with other design requirements that are taken into account later on in the design flow. Accordingly, the overall design cannot truly be considered to be DFM-optimized.

According to the preferred embodiments of the present invention, DFM improvements which could, but might not, conflict with design requirements applied during a subsequent stage in the design flow are identified and, after the design flow has proceeded to a point where the potentially-conflicting design requirement has already been taken into account, it is determined whether or not there is actual conflict. If there is no actual conflict between the design requirement and a particular DFM improvement then that DFM improvement can be applied.

In other words, in the preferred embodiments of the present invention, during the design of an integrated circuit specific opportunities for improving the design from the point of view of manufacturability are identified in a portion of a design (e.g. in a cell) but, if there is a risk that these improvements might conflict with other design requirements taken into account later in the design flow, they are not performed right away. Instead, these potentially-conflicting DFM improvements are reserved for performance at a subsequent time in the design flow when it can be evaluated whether or not they will actually conflict with other design requirements.

Thus, the preferred embodiments of the invention make it possible to implement a greater degree of DFM optimization than has been achieved in the past, at substantially no increased cost. This enables designs to be produced which achieve better product manufacturability, thereby increasing yield and so reducing the cost of each chip.

In some cases this "retrospective" application of DFM improvements could cause problems. For example, in the case of a DFM improvement consisting of doubling the contacts to a transistor within a cell, this would change the electrical behaviour of the cell and as a consequence the cell's electrical model might not be valid any more. This could render the whole block non-functional. Accordingly, in the preferred embodiments of the invention, at the time when particular DFM improvements are reserved, information is extracted characterizing the design as modified by the reserved improvements.

According to certain preferred embodiments of the invention, an instance of a particular portion of the design (e.g. a cell, a particular set of tracks, a particular transistor, etc.) incorporating one or more reserved DFM-improvements is generated and characterized so that, at a subsequent time when it is known that the reserved DFM improvement would not conflict with other design requirements, it can be swapped with the corresponding "non-optimized" portion of the design.

The present invention provides a method of designing integrated circuits as described in the accompanying claims.

The present invention provides an integrated-circuit design system as described in the accompanying claims.

An embodiment of the invention will now be described, by way of example, with reference to the drawings, of which:

FIG. 2 is a diagram schematically illustrating an example of a cell in an IC circuit design, in which:

FIG. 4 is a diagram schematically illustrating reserved-DFM zones in the cell of FIG. 2, in which:

Figure 1:
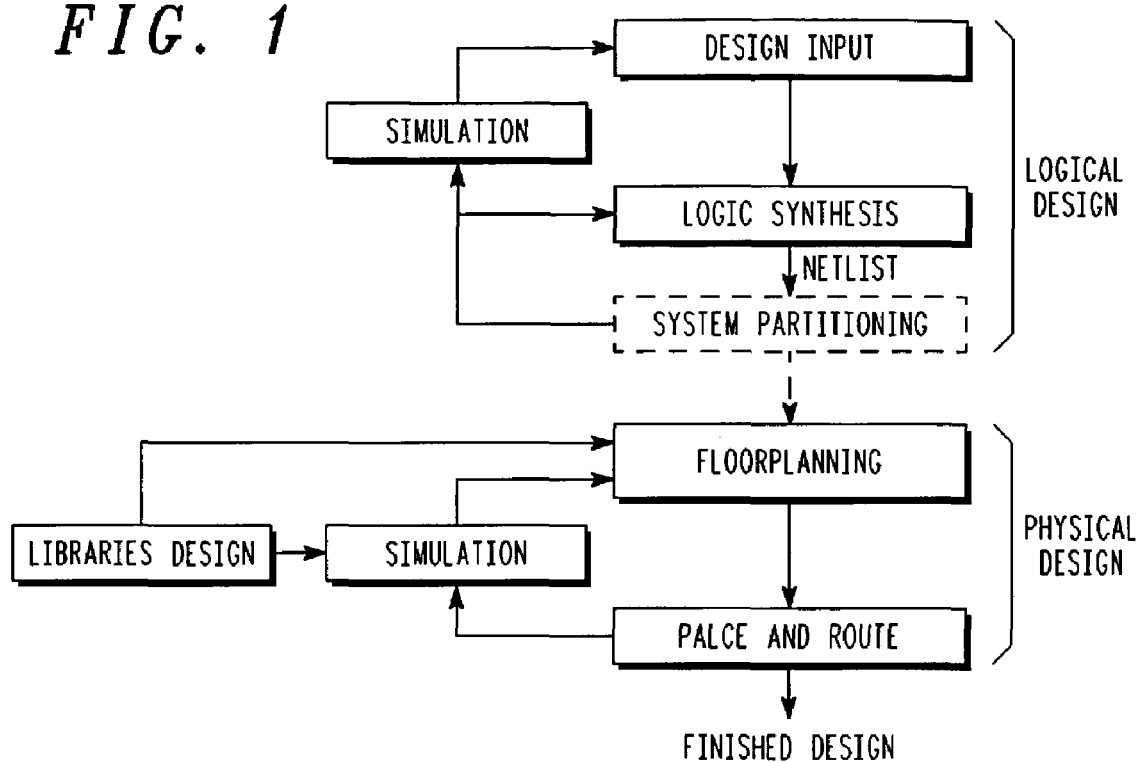
FIG. 1 is a flow diagram outlining the main stages in the design flow for designing a semiconductor integrated circuit.
Figure 2A:
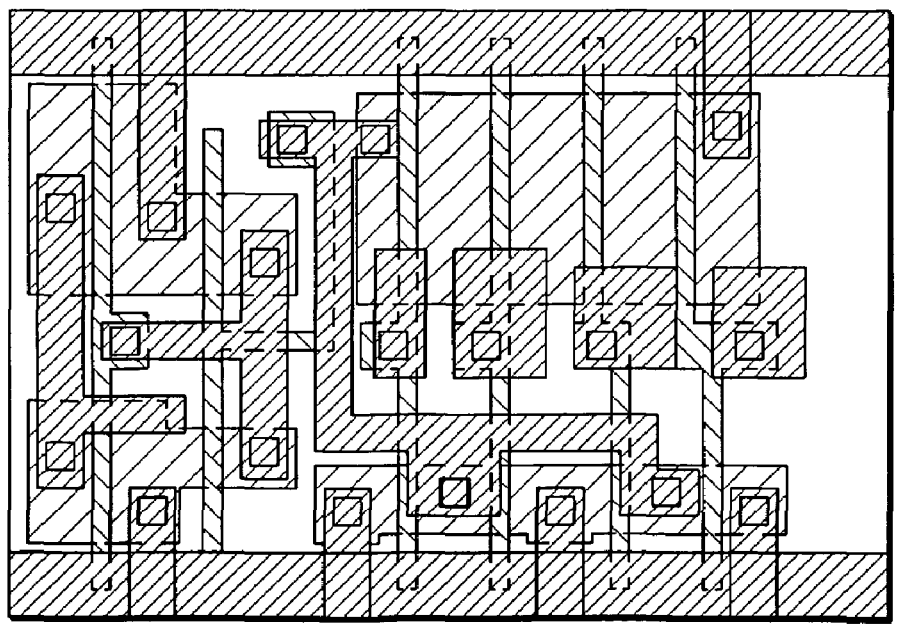
FIG. 2A shows the original design of the cell.
Figure 2B:
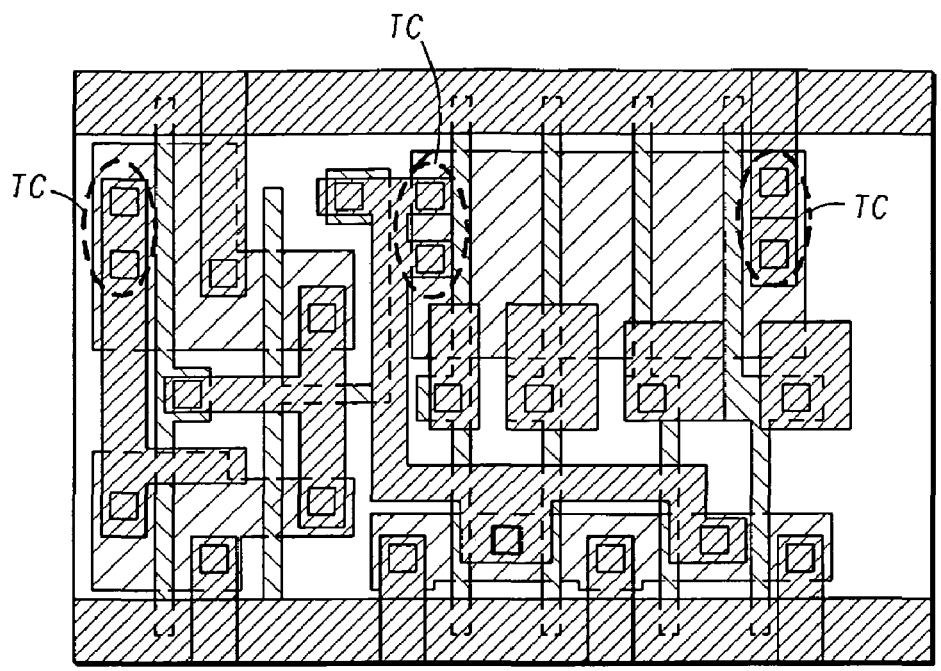
FIG. 2B shows the cell of FIG. 2A with certain DFM improvements performed.
Figure 4A:
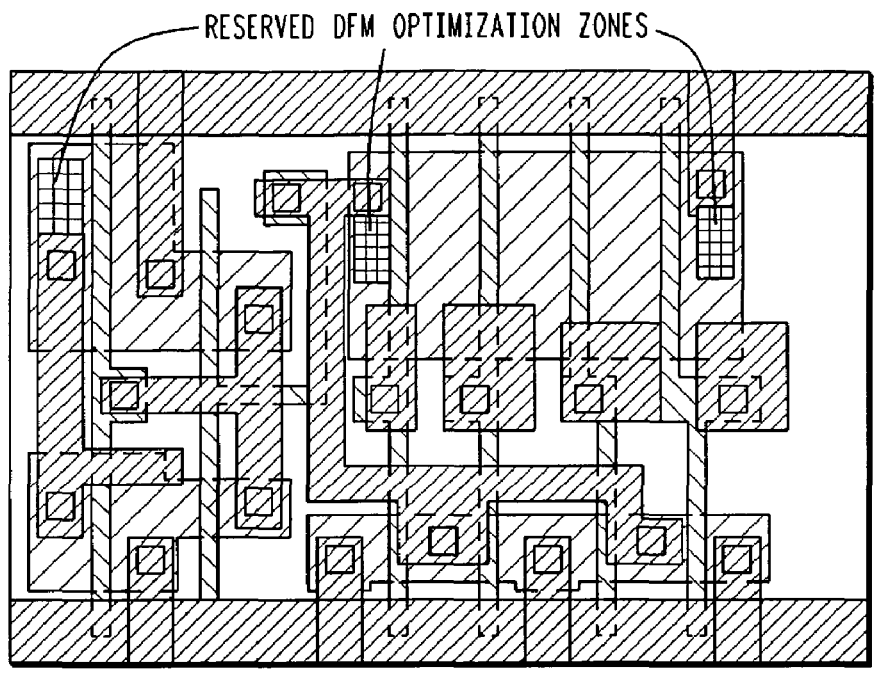
Figure 4B:
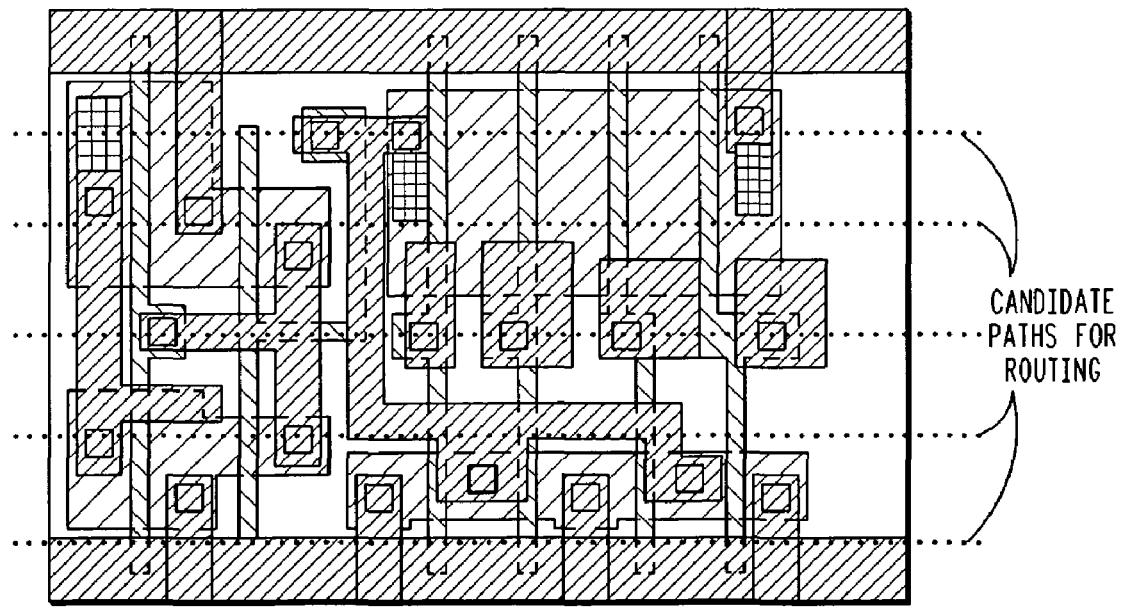
Figure 5A:
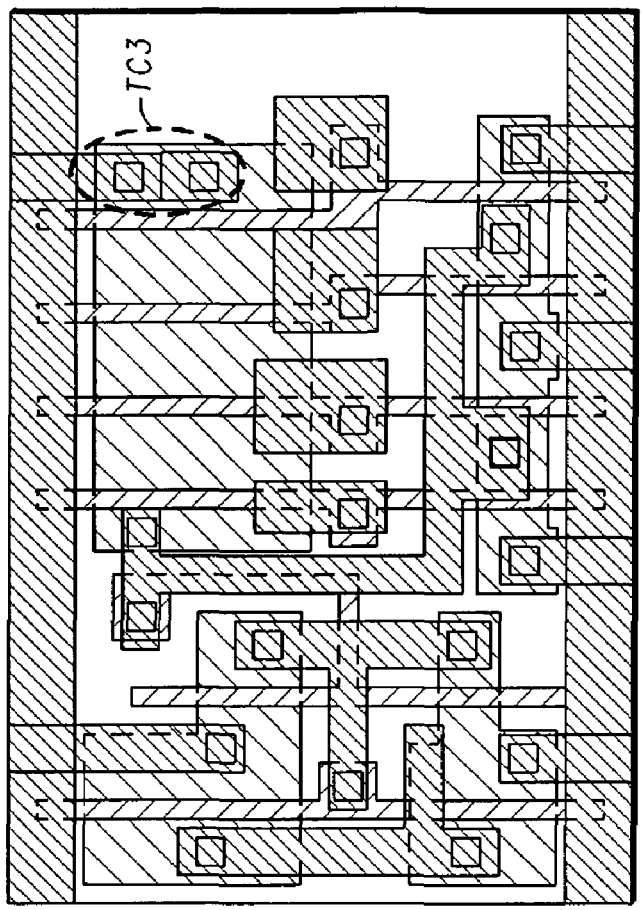
Figure 5A:
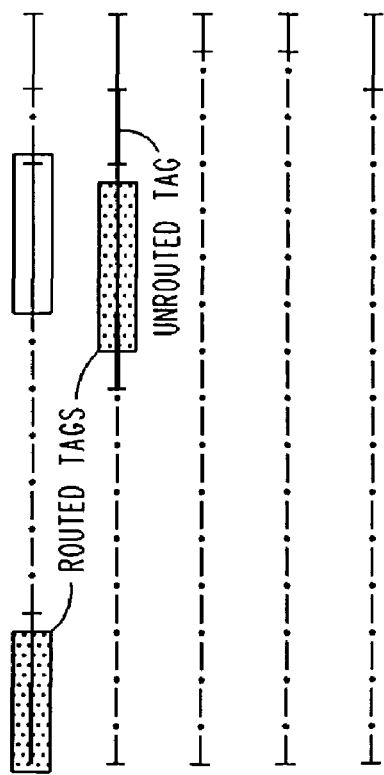
Figure 5B:
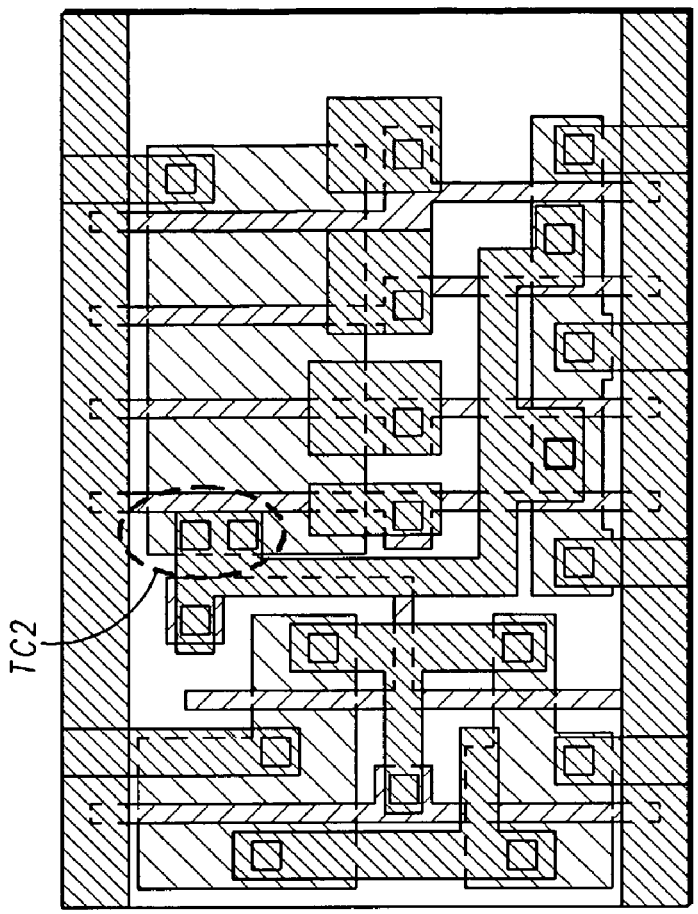
Figure 5B:
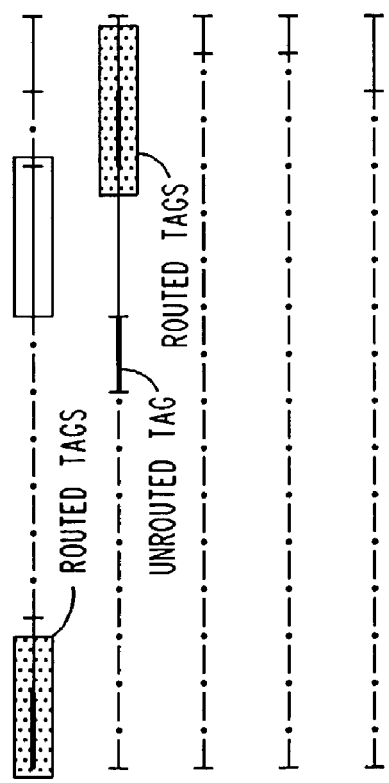

FIG. 4A indicates where reserved-DFM zones corresponding to the improvements shown in FIG. 2B are located, and FIG. 4B indicates where the reserved-DFM zones are located relative to candidate paths for routing; and FIG. 5 is a diagram schematically illustrating how routing affects the selection of which reserved DFM improvements will actually be performed, in which:

FIGS. 5A and 5B indicate examples involving different routings.

As indicated above, during design of an IC there are many different situations in which a potential DFM improvement (or optimization) has heretofore gone unimplemented for fear that it would conflict with some other design requirement that will be taken into account at a later stage in the design flow. The present invention is applicable to substantially all such situations. However, for the purposes of illustration, the following description of a preferred embodiment of the present invention considers the case of a DFM optimization which might obstruct routing, in other words, a DFM improvement which has a negative impact on cell routability.

Cell routability refers to the ease with which routing to a cell can be achieved. If there are substantially no obstructions to routing to a cell, then the cell routability is high. Cell routability can be affected by all changes made at metal levels.

If we consider the case of a design process making use of a cell library established for cells involving two metal layers (M1 and M2), DFM principles teach various different measures that will often improve the design, for example:

using twin contacts rather than a single contact,
using twin vias rather than a single via,
spreading M1 (or M2) wires apart from each other,
upsizing M1 (or M2) wires, i.e. increasing their width,
increasing the width of enclosures of M1 (or M2) around particular contacts or vias,
increasing the size of small M1 areas (or small M2 areas),
etc.

All of the above measures could, potentially, create a barrier to routing to the cell so all of these measures reduce cell routability. However, for simplicity, the subsequent description of the preferred embodiment of the invention will consider only the case of a DFM improvement that consists of replacing single contacts by twin contacts.

Figure 2C:
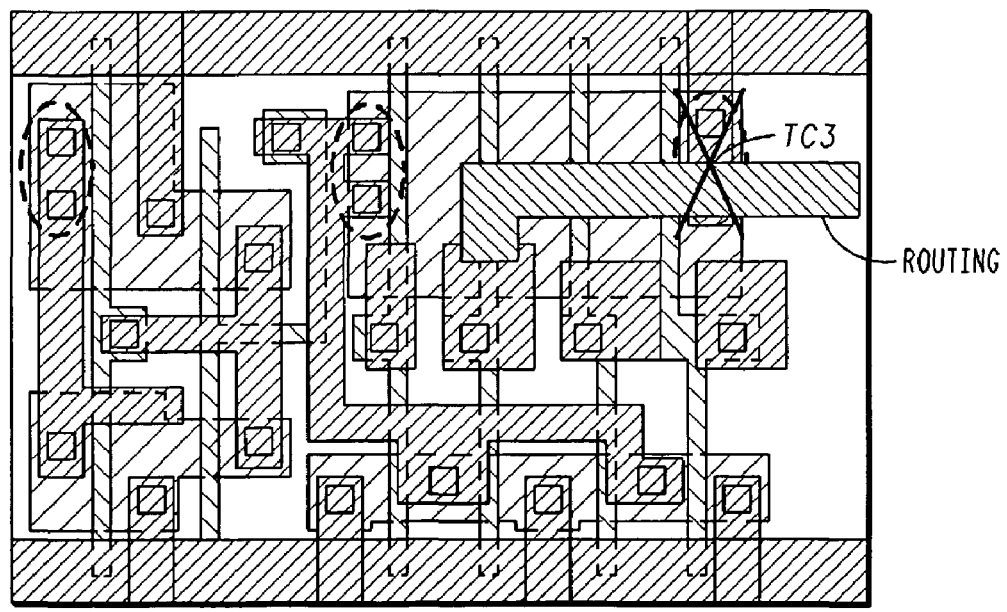
FIG. 2C illustrates a conflict between the DFM improvements of FIG. 2B and a particular routing option.

FIG. 2 illustrates the adverse effect that use of twin contacts during cell design can have on subsequent routability of a cell. An example of a cell under design is shown in FIG. 2A. The yield of the finished product would be improved if certain of the contacts in this cell were to be made twin contacts, rather than the single contacts shown in FIG. 2A. FIG. 2B illustrates three locations where twin contacts could be provided (see the ringed areas labelled TC). Unfortunately, use of twin contacts reduces the routability of this cell, as indicated in FIG. 2C.

Specifically, it may be desired to locate a routing track at the location indicated in FIG. 2C. Provision of a twin contact at the position labelled TC3 in FIG. 2C would conflict with this routing choice. At the time when the cell of FIG. 2 is being designed it is not yet known which paths will be used for the eventual routing to this cell. Accordingly, in a conventional process for designing ICs, the contacts of the cell in FIG. 2 would be left as single contacts.

According to the preferred embodiment of the present invention, the opportunities for DFM optimization indicated by the twin contacts in FIG. 2B are identified and reserved, to be implemented at a later stage if this can be done without conflicting with other design requirements.

Figure 3:
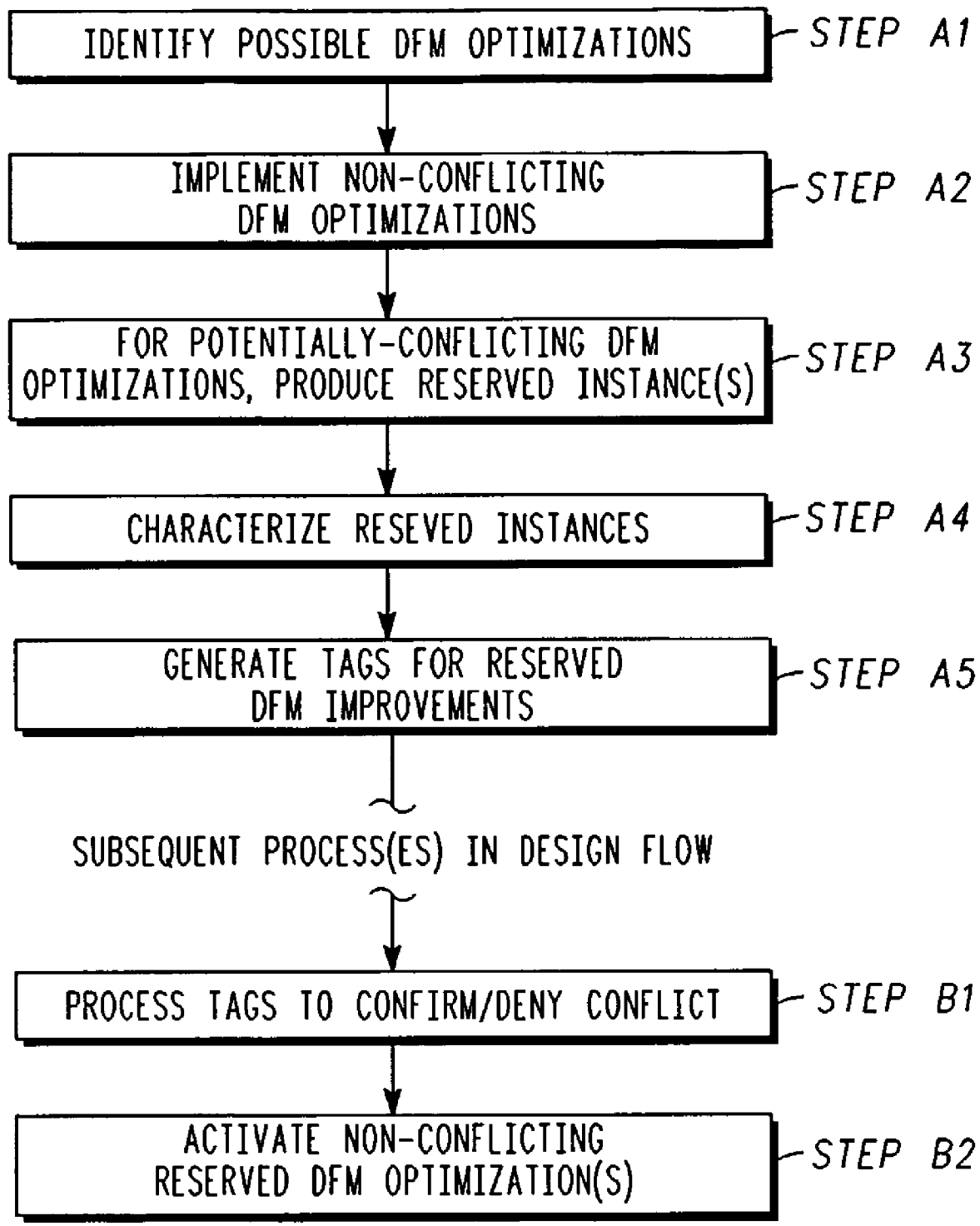
FIG. 3 is a flow diagram illustrating the main steps in an IC-design process according to a preferred embodiment of the present invention.

FIG. 3. is a flow diagram indicating the main steps in a DFM-improvement process of the IC design method according to a preferred embodiment of the present invention. The DFM-improvement process will be explained in a context where it is being applied during a cell design stage of the design flow and DFM optimization at this stage could conflict with design requirements applicable during a later block design stage, notably during a routing stage (e.g. block synthesis and route). However it is to be understood that the present invention is applicable more generally to substantially any stage in the design flow where DFM optimization is possible but might conflict with design requirements applicable during a later stage in the design flow.

More particularly, the following description of FIG. 3 will assume that the DFM-improvement process is being applied for improvement of the design of the cell illustrated in FIG. 2. Moreover, it will be assumed that the cell design is being performed in a context which makes use of libraries of cells which are assembled in order to make larger functional blocks (e.g. for logic synthesis, in memory compilers, in full custom blocks, etc).

As indicated in Step A1 of FIG. 3, the first main step in the DFM-improvement process consists in identifying what DFM improvements are possible for this cell. There may well be some DFM improvements which can be applied to the cell without any risk of conflict with other design requirements (including those which are only applicable during a later stage in the design flow). Accordingly, any such non-conflicting improvements are implemented, as indicated by step A2 in FIG. 3. Specifically, DFM improvements which will have no effect on the cell's routability will be implemented.

Next, unlike conventional IC-design methods, in the IC-design method of the present invention the DFM-improvement process continues to consider DFM-optimizations that could potentially conflict with design requirements applicable during a later stage of the design flow, in other words DFM-improvements whose suitability is contingent on decisions taken at a later stage during the design flow. (When it is known already that a particular DFM improvement does actually, or inevitably will, conflict with other design requirements it will, of course, be rejected at this stage.)

The potentially-conflicting DFM improvements are reserved, that is, they are not made in the cell under design that will go forward to subsequent stages of the design flow. However, according to the preferred embodiment of the invention, one or more alternative instances of the cell are generated and stored in the cell library. In each alternative instance of the cell, some or all of the potentially-conflicting DFM improvements are made—see step A3 of FIG. 3. In the following description these alternative instances of the cell are termed "reserved instances" or "DFM-improved instances" of the cell in question. Each reserved instance of the cell is characterized so that its entry in the cell library includes the usual information descriptive of the cell properties, for example: a physical layout, behavioural model, a detailed timing model, a circuit schematic, a wire-load model, etc.—see step A4 of FIG. 3.

Now, when reserved DFM improvements are identified for a cell and a reserved instance of the cell is generated for possible swapping into the design-in-progress later on, it could be wondered which reserved DFM improvements to include in the reserved instance of the cell. For example, if there are 3 reserved DFM improvements called A, B and C respectively then, in theory, there are 7 different possible reserved instances of this cell that could be generated: one (ABC) in which all 3 reserved DFM improvements are made, one (AB) in which only reserved improvements A and B are made, and others (BC), (AC), (A), (B), and (C) incorporating other respective different combinations of the possible reserved DFM improvements for this cell.

It would be possible to generate and store a set of reserved cell instances, each reserved instance corresponding to a different one of the possible combinations of reserved DFM improvements identified for this cell. However, this would increase the time required for processing and the space required for storing data. Therefore, it is preferable to store a set of reserved cell instances that is smaller than that required to cater for the theoretical maximum number of different possible combinations.

In practice, a design method can be adopted in which, for a given cell Q, a single reserved cell instance is generated and stored; this single reserved cell instance incorporating all of the reserved DFM improvements identified for cell Q. At a subsequent stage in the design flow, it is then verified whether or not design rules have been implemented in such a way that the reserved DFM improvements do or do not cause conflict. In the case where the reserved DFM improvements are found not to cause conflict, then the reserved cell instance can be swapped for the corresponding cell instance in the design-in-progress. If, on the other hand, any of the reserved DFM improvements for this cell are found to cause conflict, then this reserved cell instance is not used. This is a kind of "all or nothing" approach.

Although the above "all or nothing" approach might be considered to be a coarse method of improving the degree of DFM-optimization of a design, it has been found in practice to produce worthwhile improvements in the degree of DFM optimization of a design whilst still keeping processing time and data-storage requirements to acceptable levels. This can be understood when it is considered that, in the case where reserved DFM improvements could potentially conflict with routing choices, it is found that they do not cause conflict in the majority of cases.

FIG. 4A shows the cell of FIG. 2 with checked rectangles indicating the regions in the cell that are affected by reserved DFM improvements corresponding to the three doubled-contacts shown in FIG. 2B. The extent of the physical region affected by a given DFM improvement depends upon the nature of that improvement and the nature of design rule with which it potentially will comes into conflict. However, given that the nature of the potentially-conflicting design rule and DFM improvement are known at the stage when the DFM improvement is being identified, it is possible to calculate the region that would potentially be affected by a reserved DFM improvement.

According to the preferred embodiment of the invention, when a reserved DFM improvement is identified for a given element in the circuit under design, meta information relating to the reserved DFM improvement is generated and associated with that element. In the present document this meta data is referred to as a "tag" or "tag data". The nature, syntax and processing of the tag depends upon the nature of the reserved DFM improvement and the design rule with which it may conflict.

The tags can designate the entire physical area that would be affected by the DFM improvement in question (e.g. the whole of the checked regions in FIG. 4A). However, this is but one of a large number of different possibilities. For example, in a case such as that presently under consideration, where a potential DFM improvement may interfere with cell routability, the designer may know in advance where on the cell the routing-tracks are susceptible to be positioned. In other words, the designer may already know where on the cell there are candidate paths for routing-tracks. A set of such candidate paths for routing to the cell of FIG. 2 is marked on FIG. 4B in dotted lines. Thus, in such a case, it is sufficient to tag the regions of these candidate paths which correspond to locations that would be affected by a reserved DFM improvement.

According to the preferred embodiment of the invention when used to improve the design of the cell shown in FIG. 2, path (or track) segments are tagged which overlap with, or are within a certain proximity of, the physical locations at which second contacts would be provide if contacting doubling were to be implemented. The use of these tags in improving the design of the FIG. 2 cell is discussed in greater detail below in relation to FIGS. 5A and 5B.

It is already known to label candidate paths for routing-tracks so as to indicate which segments thereof are useable for routing ("routable") or unusable for routing ("non-routable"). Thus, at the start of the routing stage in the design flow information may already be available defining a plotting of the candidate paths for the routing-tracks with different segments thereof marked as "routable" or "non-routable", respectively. In particular, there could be a location at which a candidate path crosses a conductor which it is forbidden to cover. The location at which the candidate path crosses the conductor will be labelled as "non-routable" so that, during the routing stage, it is not selected as the path for a routing-track in the final design.

According to the preferred embodiment of the invention, the tagged track segments, or other regions in the design which correspond to the reserved DFM improvements, are useable in subsequent stages of the design flow. In other words, in the present example the tagged segments of candidate paths for the routing-tracks are identified in a manner which allows them to be used for routing in a subsequent routing stage of the design flow.

Once any reserved instances of the cell have been generated and characterized, and tags have been generated corresponding to these reserved DFM-improvements, the rest of the DFM-improvement process of FIG. 3 awaits a later stage in the design flow. Specifically, the next steps in the DFM-improvement process of FIG. 3 await accomplishment of some subsequent stage in the design flow during which one or more design requirements are applicable which might or might not conflict with the reserved DFM improvements.

In the present example of improvement of the FIG. 2 cell, the next steps of the DFM-improvement process of FIG. 3 are deferred until after block synthesis and routing have been performed. Once block synthesis and routing has been performed it is possible to detect whether routing has taken place at a location which conflicts with a given reserved DFM improvement. More particularly, according to the preferred embodiment of the present invention, after routing has taken place a comparison is made between the tracks that have actually been used for routing and the tags which identify regions corresponding to particular reserved DFM improvements—see step B1 of FIG. 3.

For each non-routed tag (that is, for each tag that identifies a region which has not been used for routing), the corresponding DFM improvement is activated—see step B2 of FIG. 3. This can be achieved by accessing the cell library to retrieve the reserved cell instance which corresponds to the current cell but in which this reserved DFM improvement has been implemented. Because the reserved instance of this cell has already been characterized it is possible to ensure that the characteristics of the replacement cell (electrical properties, timing delays, etc.) are appropriate to ensure proper functioning of the overall block. If the reserved instance of the cell does not have suitable characteristics, then it simply is not swapped into the design-in-progress. It could be contemplated to modify the design of the reserved instance in order to render its characteristics acceptable. However, this would involve time-consuming and urgent action by the cell designers and is liable to be impractical.

The DFM-improvement process of the preferred embodiment of the invention will be better understood from a consideration of the examples shown in FIGS. 5A and 5B. Each of these figures shows, on the left-hand side thereof, a set of candidate paths for routing-tracks which could be used for routing to the cell shown on the right-hand side of the corresponding figure. In reality, the candidate paths should overlie the corresponding cell as in FIG. 4. However, in FIG. 5 the candidate paths have been offset to the left relative to the cells, to aid understanding.

In FIGS. 5A and 5B the candidate paths for the routing-tracks are marked to indicate the segments thereof which are "routeable" (shown using thin solid lines), "non-routeable" (shown using dot chain lines) and "tagged" (shown using thick solid lines). The tagged segments correspond to segments of the candidate paths which overlap with, or are within a predetermined distance of, regions affected by a reserved DFM improvement.

It will be seen in FIGS. 5A that 5B that the set of candidate paths for routing-tracks include three tagged segments; these correspond to the three locations TC at which a second contact could be provided so as to produce twinned contacts (see FIG. 2B).

In FIGS. 5A and 5B, grey rectangles are marked over the candidate paths for the routing-tracks to indicate the locations at which it is decided to implement routing.

FIG. 5A illustrates a first example in which it is decided to make use of routing at three locations, two of which affect tags. The tag which corresponds to the reserved DFM improvement TC3 is unaffected by the routing. Accordingly, the cell can be replaced by a reserved cell instance in which the improvement TC3 has been implemented. In other words, a second contact will be used in the cell at the location TC3 so as to produce a twin contacts in this region.

FIG. 5B illustrates a second example using routing which is slightly different from that of FIG. 5A. In this second example, the actual routing selected for this cell affects the tags corresponding to the outer two reserved DFM improvements. The tag which corresponds to the reserved DFM improvement TC2 is unaffected by the routing. Accordingly, the cell can be replaced by a reserved cell instance in which the improvement TC2 has been implemented. In other words, a second contact will be used in the cell at the location TC2 so as to produce twinned contacts in this region.

In the above-described preferred embodiment of the invention, particular DFM improvements affecting the design of a cell, and potentially conflicting with subsequent routing choices to the cell, were associated with tag data which identified track segments that overlay or were within a prohibited degree of proximity to physical regions affected by the reserved DFM improvements. However, as indicated above, the nature of the tag data is not particularly limited.

More particularly, the nature and content of the tag is adapted to the nature of the DFM improvements being reserved. Moreover the tag is formatted so as to be useable in a subsequent check as to whether or not the reserved DFM improvement does or does not actually conflict with a given design rule. This will be demonstrated by consideration of a few examples.

EXAMPLE 1

DFM Improvements Identified During Schematics-Design

When the reserved DFM improvement is identified during the stage in the design flow which deals with schematics, the tag can be a meta information tag associated with a circuit object. For instance, the design flow may specify that a transistor of a particular type, labelled XYZ, is to be used. Some electrical property of the transistor may be set to a particular value—this is called "option A". However, a DFM improvement may be possible that would use a different value for this same electrical property—this shall be called option A'. This DFM improvement could conflict with a design rule that will be applied later on in the design flow. Thus, according to the present invention, the DFM improvement is reserved.

Information for the transistor XYZ will generally be logged in a database and, in this example, will indicate that option A is to be used for this transistor. However, according to a preferred embodiment of the present invention, the database entry for transistor XYZ is supplemented by tag data indicating that option A' is to be used if the physical implementation allows it. At a subsequent stage in the design flow when the physical implementation has been determined to a greater degree (e.g. after a layout stage), a check is made as to whether or not the physical implementation does allow option A' to be used for transistor XYZ. If it does, option A' is adopted (in other words, the corresponding reserved DFM improvement is implemented).

The tag data could specify the conditions which determine whether or not "the physical implementation allows" use of option A', for example, "if it does not increase the area occupied on the wafer, use option A'" or "if there is p amount of space around transistor XYZ use option A'". Alternatively, these conditions may be programmed into the module which performs the check and the tag may simply convey information needed for performance of the check, e.g. data indicating the area on the wafer that would be occupied if option A' were to be adopted, or data indicating how much space is required around transistor XYZ in order for option A' to be feasible, etc.

EXAMPLE 2

DFM Improvements Identified During Block Routing

When the reserved DFM improvement is identified during the stage of determining the routing between blocks, the tag can be meta information associated with a particular block. For example, when routing a given block B1 it may be decided to position two tracks, TA and TB, so that they are spaced apart by a distance D. A potential DFM improvement would involve increasing the spacing between these two tracks to a greater distance D'. However, adopting the greater spacing could lead to a conflict with a design rule later on so, according to the present invention, the potential DFM improvement is reserved.

In this case, a tag can be associated with block B1 so as to indicate that spacing D' should be used between the tracks TA and TB if the subsequently-applied design rule allows. However, it should be noted that even for a single type of DFM improvement the tag format is very flexible and need not indicate directly the DFM-improved spacing D' between the tracks TA and TB. Instead, the tag could indicate some other relevant information, for example, the "DFM-improved" locations of tracks TA and TB to be used if the subsequently-applied design rule allows.

Once again, the tag data could specify the conditions which determine whether or not "the subsequently-applied design rule allows" use of spacing D', for example, "if density in the areas where there is a junction between block B1 and other blocks is below a threshold value, set the spacing between tracks TA and TB to distance D' (or set tracks TA and TB to new locations TA' and TB')". Alternatively, the conditions which determine whether or not the "subsequently-applied design rule allows" use of spacing D' between tracks TA and TB may be programmed into the module which performs the check. In the latter case, the tag may simply convey information needed for performance of the check, e.g. data indicating the physical areas where the density should be checked.

It will be seen for the above explanation that there is considerable flexibility in the format and nature of the tags. In general it can be said that the tags are meta-information items associated with elements in the circuit design which could be DFM-improved if a reserved DFM improvement were to be implemented. This meta information triggers and/or is used in a subsequent verification that is performed in order to see whether the reserved DFM improvement does or does not actually conflict with a design rule applied subsequently to the step at which the reserved DFM optimization was identified.

The DFM-improvement process of the present invention makes it possible to optimize an IC design to a greater degree than has been possible before, giving lower cost per die, a faster yield learning-curve and statistically-significant improvements in yield for substantially no increase in cost.

The above-described DFM-improvement process can be implemented using any convenient hardware/software. Typically, the process will be implemented using a CAD system. This system can be implemented by adaptation of known CAD systems/software. Some known CAD systems used for IC design already include software routines or modules for identifying DFM opportunities. The tagging of reserved DFM improvements can be done manually or it can be automated by appropriate configuration of software such as Cadabra™ (CAD software produced by Synopsis Inc which handles automated layout of cells from a cell library). Existing software routines or modules used for implementing the place and route stage of the design flow can readily be adapted so as to include a routine and/or module for identifying which tags have been affected by routing. Existing software routines or modules already allow cell swapping. Such routines/modules can be adapted and configured so as to implement the appropriate cell swapping for reserved DFM-improvements corresponding to unrouted tags.

Although the present invention has been described above with reference to certain particular preferred embodiments, it is to be understood that the invention is not limited by reference to the specific details of those preferred embodiments. More specifically, the person skilled in the art will readily appreciate that modifications and developments can be made in the preferred embodiments without departing from the scope of the invention as defined in the accompanying claims.

For example, although the IC design-improvement process of the preferred embodiment of the invention was described above in connection with a particular flow diagram (FIG. 3), it is to be understood that the order of the steps in the process may be varied to some extent. For example, tag data can be generated for the reserved-DFM zones before the corresponding reserved instance is (or instances are) generated and characterized (in other words, step A5 of FIG. 3 can come before step A3). As another example, it is not essential to implement the non-conflicting DFM improvements before the potentially-conflicting DFM improvements are tagged, instantiated and characterized; they could be performed afterwards (in other words, step A2 of FIG. 3 can come after step A5).

Moreover, although the present invention has been described above in the context of the identification of potential DFM improvements during cell design and the implementation of reserved improvements after the routing stage in design flow, it is to be understood that the present invention is applicable much more generally. In particular, the search for DFM improvements to be reserved can be performed at substantially any stage in the design flow. Similarly, the implementation of reserved DFM improvements can be performed at substantially any stage in the design flow although, clearly, the reserved improvements will await implementation until such time as it can be determined whether or not the potential conflict between them and a design requirement has become an actual conflict.

Furthermore, the invention covers the situation where a plurality of DFM-improvement processes are running in parallel in an overlapping fashion: for example, the design flow for a single IC might include three overlapping DFM-improvement processes, a first DFM-improvement process involving identifying and reserving DFM-improvements during a design stage which sets the schematics of the circuit, for implementation after the layout stage, a second DFM-improvement process involving identifying and reserving DFM improvements during cell design, for implementation after routing, and a third DFM-improvement process involving identifying and reserving DFM improvements during routing, for implementation after block abutment.

When a plurality of DFM-improvement processes are running in parallel as mentioned above, it is preferable to use different modules to handle each of the parallel processes. This is because the nature and use of the tags associated with the reserved DFM improvements vary depending upon the nature of the DFM-improvement and/or the stage in the design flow at which the "conflicting" or "non-conflicting" status of the DFM-improvement is being verified.

Moreover, although the above-described preferred embodiment has been described in terms of an example in which a plurality of potentially-conflicting DFM improvements are identified and reserved during a given stage in the design flow, it is to be understood that the present invention is not limited with regard to the number of improvements that are identified and reserved at a given stage during the design flow. Depending upon the circuit design, at a particular stage in the design flow perhaps no potentially-conflicting DFM improvements will be found, or only one, or two, or a greater number.

Furthermore, although the preferred embodiment of the present invention has been described in a context in which cell libraries are used in the elaboration of an integrated circuit design, it is to be understood that the reserved DFM optimization techniques of the present invention may also be applied in contexts in which elements of the circuit are being designed without use of libraries. For example, if a memory leaf cell is being designed then, during the memory generator process, DFM improvements which potentially-conflict with other design requirements can be identified and reserved for implementation at a later stage. Details of the reserved DFM improvements are stored until such time as it can be decided whether or not there is actual conflict with the other design requirements.

The invention claimed is:

1. An integrated-circuit design method implementing a series of design stages to generate, in the final design stage of said series, design data defining an integrated circuit, each of the design stages processing design stage representing the design-in-progress, said integrated-circuit design method comprising a process for improving the manufacturability of the integrated circuit by:
   during at least one design stage of said series, identifying, in a portion of the design-in-progress, a set of one or more DFM improvements that could be made, at least one DFM improvement in said set potentially conflicting with a design requirement applicable during a later design stage in said series;
   deferring said at least one potentially-conflicting DFM improvement such that said potentially-conflicting DFM improvement is not implemented during the design stage where it is first identified;
   determining, during said later design stage, whether or not at least one potentially-conflicting DFM improvement identified and deferred at an earlier design stage actually conflicts with one or more design requirements applicable during said later design stage; and
   implementing, in the design, said deferred at least one potentially conflicting DFM improvement only after it has been determined, in said determining step during said later design stage, that there is no actual conflict with said specified one or more design requirements, and wherein:
   said manufacturability-improving process comprises the step of identifying, in said portion of the design-in-progress performed by an integrated-circuit design system, a region or regions that would be affected by a particular DFM improvement of said set; and
   the determining step of said manufacturability-improving process comprises verifying whether there are any of said identified regions that are unaffected by said one or more design requirements, and deciding that the DFM improvement(s) corresponding to said unaffected identified region(s) does (do) not conflict with said one or more design requirements, wherein:
   said one or more design requirements comprise the requirement for a region affected by a DFM improvement not to overlap with, or be within a predetermined distance of, a connection track;
   said region-identifying step comprises the step of tagging segments of candidate paths for connection tracks, the tagged segments of the candidate paths corresponding to segments of the candidate paths which overlap with or are within a predetermined distance of a region affected by a DFM improvement, and
   the verifying step comprises verifying, after routing to said portion of the design-in-progress has been performed, which tagged segments of candidate paths for connection tracks have not been used for routing.

2. The integrated-circuit design method of claim 1, wherein:
   said manufacturability-improving process comprises the step of generating meta-information associated with respective DFM improvements of the set, and
   said determining step is adapted to process meta-information associated with a particular DFM improvement whereby to determine whether or not said particular DFM improvement actually conflicts with said one or more design requirements.

3. The integrated-circuit design method of claim 1, wherein:
   said manufacturability-improving process comprises the step of, during said at least one design stage, generating and storing a reserved instance of said portion of the design-in-progress, said reserved instance corresponding to said portion of the design-in-progress modified to include some or all of the DFM improvements of said set, wherein said reserved instance is not incorporated into the design-in-progress during the design stage where it is generated; and
   the improvement-implementing step of said manufacturability-improving process comprises swapping, for said portion of the design-in-progress, a reserved instance including one or more DFM improvements, of said set, which have been determined during said later design stage not to conflict with said one or more design requirements.

4. The integrated-circuit design method of claim 3, wherein:
said manufacturability-improving process comprises the step of generating and storing data characterizing said reserved instance; and
the improvement-implementing step of said manufacturability-improving process comprises a step of analysing the data characterizing a reserved instance so as to ensure that swapping said reserved instance for said portion of the design-in-progress will not have an adverse effect on the functioning of the circuit under design.

5. The integrated-circuit design method of claim 1, wherein said portion of the design-in-progress corresponds to a cell of the integrated circuit under design.

6. The integrated-circuit design method of claim 1, wherein the process for improving manufacturability is applied a plurality of times during the design of the overall circuit, each application of the manufacturability-improvement process comprising the identification, at a respective first stage in the design flow, of a set of one of more DFM improvements that potentially conflict with a respective set of design requirements applicable during a respective second stage of the design flow, and the implementation, at the respective second stage, of one or more of the respective set of DFM improvements which are determined, at said respective second stage, not to conflict with the respective set of design requirements; wherein the second stage of each application of the manufacturability-improvement process is subsequent to the first stage thereof.

7. An integrated-circuit design system for implementing a series of design stages to generate, in the final design stage of said series, design data defining an integrated circuit, each of the design stages processing design data representing the design-in-progress, said integrated-circuit design system comprising:
identification means for identifying during at least one design stage of said series, in a portion of the design-in-progress, a set of one or more DFM improvements that could be made, at least one DFM improvement in said set potentially conflicting with a design requirement applicable during a later design stage in said series, said at least one DFM improvement being deferred;
determining means for determining, at said later design stage, whether or not at least one potentially-conflicting DFM improvement identified by the identification means at an earlier design stage, and deferred, actually conflicts with one or more design requirements applicable during said later design stage; and
execution means for implementing, in the design, said deferred at least one potentially-conflicting DFM improvement only after it has been determined by said determining means in said later design stage that there is no actual conflict with said one or more design requirements and wherein:
said tagging means is adapted for generating meta-information indicative of a region or regions that would be affected by a particular DFM improvement of said set;
wherein the determining means is adapted to verify whether there are any of said identified regions that are unaffected by said one or more design requirements, and to decide that the DFM improvement(s) corresponding to said unaffected identified region(s) does (do) not conflict with said one or more design requirements, wherein:
said one or more design requirements comprise the requirement for a region affected by a DFM improvement not to overlap with, or be within a predetermined distance of, a connection track;
said tagging means is adapted to tag segments of candidate paths for connection tracks, the tagged segments of the candidate paths corresponding to segments of the candidate paths which overlap with or are within a predetermined distance of a region affected by a DFM improvement, and
the determining means is adapted to verify, after routing to said portion of the design-in-progress has been performed, which tagged segments of candidate paths for connection tracks have not been used for routing.

8. The integrated-circuit design system of claim 7, and comprising:
tagging means for generating and associating meta-information with respective DFM improvements of said set during said at least one design stage;
wherein the determining means is adapted to process the meta-information associated with a particular DFM improvement whereby to determine whether or not said particular DFM improvement actually conflicts with said one or more design requirements.

9. The integrated-circuit design system of claim 7, and comprising means for generating and storing a reserved instance of said portion of the design-in-progress during said at least one stage, said reserved instance corresponding to said portion of the design-in-progress modified to include some or all of the DFM improvements of said set;
wherein the execution means is adapted to swap, for said portion of the design-in-progress, a reserved instance including one or more DFM improvements, of said set, which have been determined during said later design stage not to conflict with said one or more design requirements.

10. The integrated-circuit design system of claim 9, and comprising means for generating and storing data characterizing said reserved instance;
wherein the execution means comprises analysis means for analysing the data characterizing a reserved instance so as to ensure that swapping said reserved instance for said portion of the design-in-progress will not have an adverse effect on the functioning of the circuit under design.

11. The integrated-circuit design system of claim 7, wherein said portion of the design-in-progress corresponds to a cell of the integrated circuit under design.

12. The integrated-circuit design system of claim 7, and comprising a plurality of sets of identification means, determining means and execution means, each set performing a respective manufacturability-improvement process.

* * * * *

UNITED STATES PATENT AND TRADEMARK OFFICE
CERTIFICATE OF CORRECTION

| | | |
|---|---|---|
| PATENT NO. | : 7,735,029 B2 | Page 1 of 1 |
| APPLICATION NO. | : 11/720127 | |
| DATED | : June 8, 2010 | |
| INVENTOR(S) | : Lionel Riviere-Cazaux | |

It is certified that error appears in the above-identified patent and that said Letters Patent is hereby corrected as shown below:

Column 13, Line 58, please change "and wherein:" to --wherein:--

Signed and Sealed this
Thirty-first Day of May, 2011

David J. Kappos
*Director of the United States Patent and Trademark Office*